(12) United States Patent
Marash

(10) Patent No.: US 7,711,110 B2
(45) Date of Patent: May 4, 2010

(54) UNIVERSAL SPEAKERPHONE WITH ADAPTABLE INTERFACE

(75) Inventor: Joseph Marash, Sea Cliff, NY (US)

(73) Assignee: Midas Technology, LLC, Great Neck, NY (US)

( * ) Notice: Subject to any disclaimer, the term of this patent is extended or adjusted under 35 U.S.C. 154(b) by 516 days.

(21) Appl. No.: 11/723,063

(22) Filed: Mar. 16, 2007

(65) Prior Publication Data

US 2008/0226061 A1    Sep. 18, 2008

(51) Int. Cl.
*H04M 1/00* (2006.01)
*H04M 9/00* (2006.01)

(52) U.S. Cl. .............................. 379/420.02; 379/433.02

(58) Field of Classification Search ................................
379/420.01–420.03, 433.01, 433.02, 338.01,
379/388.02, 399.01
See application file for complete search history.

(56) References Cited

U.S. PATENT DOCUMENTS 5,138,649 A    8/1992    Krisbergh et al.

2002/0044199 A1    4/2002    Barzebar et al.
2002/0061095 A1    5/2002    Beecroft

OTHER PUBLICATIONS

International Search Report for International Application No. PCT/US08/56580, dated May 23, 2008.

*Primary Examiner*—Tuan D Nguyen
(74) *Attorney, Agent, or Firm*—Pearl Cohen Zedek Latzer, LLP

(57) ABSTRACT

An adaptable or universal communication interface module is linked to a main speakerphone module having audio pickup and playback capabilities, resides between the telephone and the communications line and allows users to utilize a non-manufacturer-specific speakerphone, i.e., that that can be used with any telephone communication system. When the user wishes to conduct a "hands free" conversation, the interface module will capture the audio signals and send them to the main speakerphone module to be played on loudspeakers. The interface module will also take the processed audio signal from the main speakerphone module and plant it in the communication link in place of the audio signals coming out of the telephone.

23 Claims, 5 Drawing Sheets

UNIVERSAL SPEAKERPHONE WITH ADAPTABLE INTERFACE

FIELD OF THE INVENTION

This invention is directed to a system and method for a speakerphone containing an adaptable or universal interface. More particularly, this invention is directed to a device that includes all the critical features of a speakerphone having an adaptable or universal interface and that can be used with any telephone communication system.

BACKGROUND OF THE INVENTION

The telephone conference call has become routine in business today, in part because teleconferencing provides a convenient and inexpensive forum by which distant business interests communicate. In order to enable multiple people to participate together in a particular end of a telephone conversation, a teleconferencing system typically uses a speakerphone, which is a device with a microphone and loudspeaker, either integrated into a standard telephone in addition to the telephone's handset or provided separately as a dedicated device that does not have a handset. In a teleconferencing system, the sounds present in a room, hereinafter referred to as the "near-end room" such as those of a near-end speaker are received by the microphone and transmitted to a "far end system", and sounds detected by a far-end telephone handset or microphones are transmitted to the near-end system and broadcast by the near-end loudspeaker.

Many telephones have an integrated speakerphone function that can be activated by pushing a single button to transfer the sound input and output from the handset to the ambient microphone and loudspeaker. However, devices that are designed specifically for speakerphone use typically include one or more microphones for detection of audio signals, one or more loudspeakers for audio playback, and an interface with the user's communication link. Such speakerphones often have multiple microphone inputs arranged around the device, e.g., radially, in order to maximize sound input, such as may occur around a conference table, and the most sophisticated units allow the connection of additional satellite microphones that can be placed some distance from the main unit. Speakerphones are also designed to interface with the communication link and be used as "hands-free" telephones, they include all the typical Man-Machine Interface features such as dial pad, display and other more advanced features, such as memories, speed dial, redial and many more.

However, speakerphones and other peripheral voice devices are typically infrastructure-specific, meaning that each communicates only with a specific communication infrastructure, and that speakerphone or other peripheral voice device will not work with a different communication link. Examples of available telephone communication links are, for example:

traditional analog telephone communication (POTS or plain old telephone service wherein the analog communication is conducted on two wires);

digital switchboards, e.g., proprietary PBX (private B Exchange), a circuit-switched telephone network system designed to allow digital transmission of voice and data between the telephone and the switchboard over ordinary telephone copper wires;

USB interface connection to a computer (for Voice over Internet Protocol, or VOIP, communication), Analog In/Out (video conferencing or computer through the sound card, non-standard digital communication);

Session Initiation Protocol, or SIP, an application-layer control (signaling) protocol for creating, modifying and terminating sessions, such as Internet telephone calls, multimedia distribution and multimedia conferences, among one or more participants; and wireless communications, e.g., Bluetooth or DECT, which is an industrial specification for wireless personal area networks (PANs).

The number of available communication links continues to grow.

Speakerphone and other peripheral voice device manufacturers, therefore, currently must produce many kinds of speakerphones in order to address the large variety of available communication solutions. So far, companies have developed different versions of their speakerphones and other peripheral voice devices for different communications lines. For example, only an Avaya® brand speakerphone will work properly with an Avaya® brand telecommunications network. This requires a close relationship (and commitment) between the supplier of the speakerphones and other peripheral voice devices (often an OEM) and the communication infrastructure provider.

As a result, the end user suffers by paying higher prices for these devices in a less competitive environment and by having to depend upon the communications infrastructure provider for conferencing solutions. Similarly, the current situation also presents problems for small companies by raising the bar for speakerphone market penetration by requiring that the company make many types of speakerphone units to satisfy the different requirements of the various communication infrastructure providers.

It is desirable to provide a speakerphone that is adaptable such that it can be used with any telephone communication system.

SUMMARY OF THE INVENTION

It is one object of the present invention to provide a speakerphone that is adaptable and can be used with any telephone communication system.

It is another object of the present invention to provide a speakerphone that uses a universal interface so that it can be used with any telephone communication system.

It is another object of the present invention to provide means for the said speakerphone to obtain and deliver the audio signals directly from the communication lines.

In accordance with these and other objects, the invention provides a first embodiment of a system having a main speakerphone unit or module that will include the audio pickup and audio playback capabilities, and a separate communication interface unit or module. The interface between the main speakerphone module and the communication interface module will use the standard telecommunications infrastructure protocols, and in order to deal with most of the MMI functions, the speakerphone will utilize one of the telephones already available with the particular communication infrastructure.

As opposed to standard speakerphones and other peripheral voice devices that are infrastructure-specific, in one embodiment of the invention, the interface module, which has to date always been integrated with the speakerphone, has been separated from the main speakerphone module. Thus, the speakerphone, which is typically the most expensive part of equipment, can be chosen independently of the carrier or communications protocol or technology, and the interface module may simply be switched or modified as needed.

In this embodiment, the interface module will "sit" between the telephone and the communication line and will allow the user to utilize the telephone to dial, store and recall memories, talk through the handset and so on. When the user wishes to conduct a "hands free" conversation, the interface module will capture the audio signals and send them to the main speakerphone module to be played back on the main speakerphone module loudspeakers. The interface module will also take the processed audio signal from the main speakerphone module and plant it in the communication link in place of the audio signals coming out of the telephone. The device interfaces to the communication line by listening and intervening in the audio portion of the communication while leaving the control signals and allowing other devices handle the command portion of the communication.

The interface module could incorporate software for one particular telecommunications protocol so that it can be changed when necessary to deal with a different communications protocol or telephone manufacturer. Changing the interface module is fairly simple, as it entails a simple mechanical connection between the interface module on one hand and the telephone and communications line on the other hand. If the interface module is adapted for a particular manufacturer's protocol, the mechanical connection could also be specific.

Alternatively, in another embodiment of the invention, the entire interface module need not be changed but rather only the software card that incorporates the software for the specific particular telecommunications protocol need be changed when the telecommunications protocol is to be changed. In this case, the interface module would have mechanical connections that are specific for the particular manufacturers whose protocols have been coded for use.

Alternatively, in a still further embodiment of the invention, even the software card for the specific particular telecommunications protocol need not be changed when the telecommunications protocol is to be changed. In this embodiment, the interface protocol could be programmed for all the specific particular telecommunications protocols. In this case, the interface module would have mechanical connections that are specific for the particular manufacturers whose protocols have been coded for use, and the software would automatically understand which communications protocol software to use when the audio portions of the communication pass between the telephone and the communication line.

Other features and advantages of the present invention will become apparent from the following detailed description examples and figures. It should be understood, however, that the detailed description and the specific examples while indicating preferred embodiments of the invention are given by way of illustration only, since various changes and modifications within the spirit and scope of the invention will become apparent to those skilled in the art from this detailed description.

BRIEF DESCRIPTION OF THE DRAWINGS

The above and other objects and advantages of the invention will be apparent upon consideration of the following detailed description, taken in conjunction with the accompanying drawings, in which the reference characters refer to like parts throughout and in which.

DETAILED DESCRIPTION OF THE INVENTION

Figure 1:
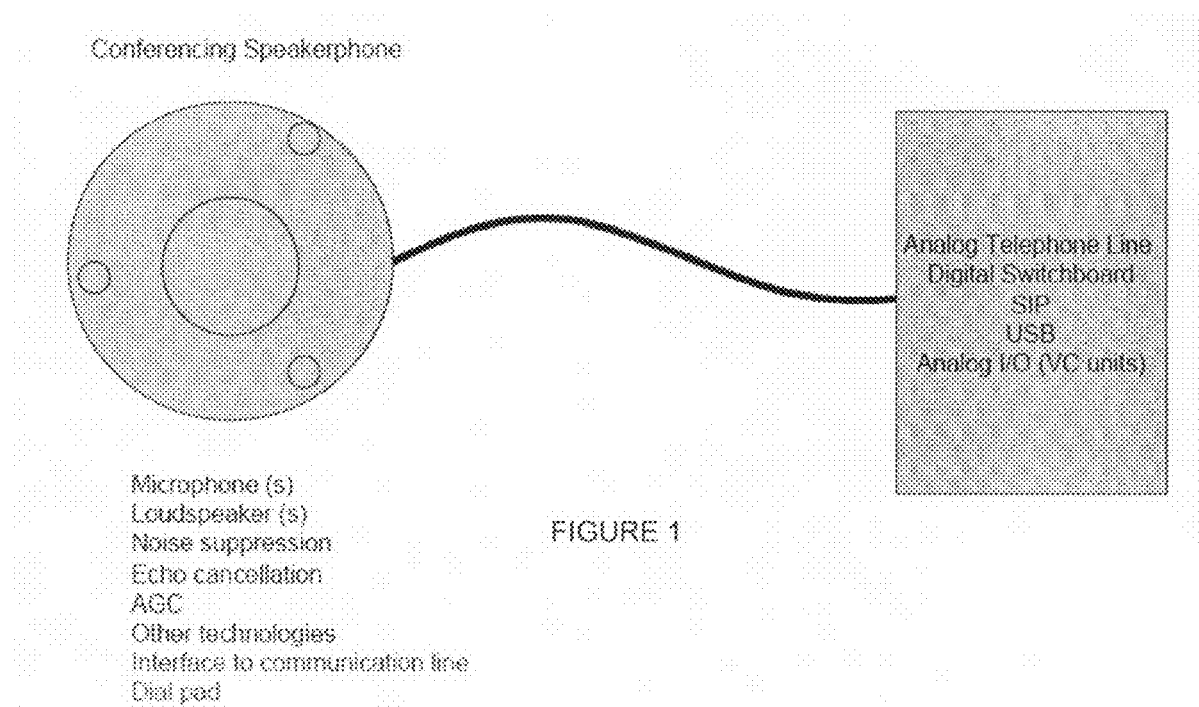
FIG. 1 shows a schematic view of a standard telephone configuration.

Referring to FIG. 1, a schematic view of a standard telephone configuration, the communications infrastructure can be one of any known telephone communications infrastructures, such as analog telephone lines, digital switchboard, SIP, USB or Analog I/O (VC units), as discussed above. A basic conferencing speakerphone, which includes at least one microphone and at least one loudspeaker, and may also contain additional features such as noise suppression, echo cancellation, AGC, a dial pad and an interface to the communication line, is electronically connected to the communications infrastructure. Such a speakerphone also necessarily includes some sort of interface with the particular telephone communications infrastructure for which it has been manufactured.

Figure 2:
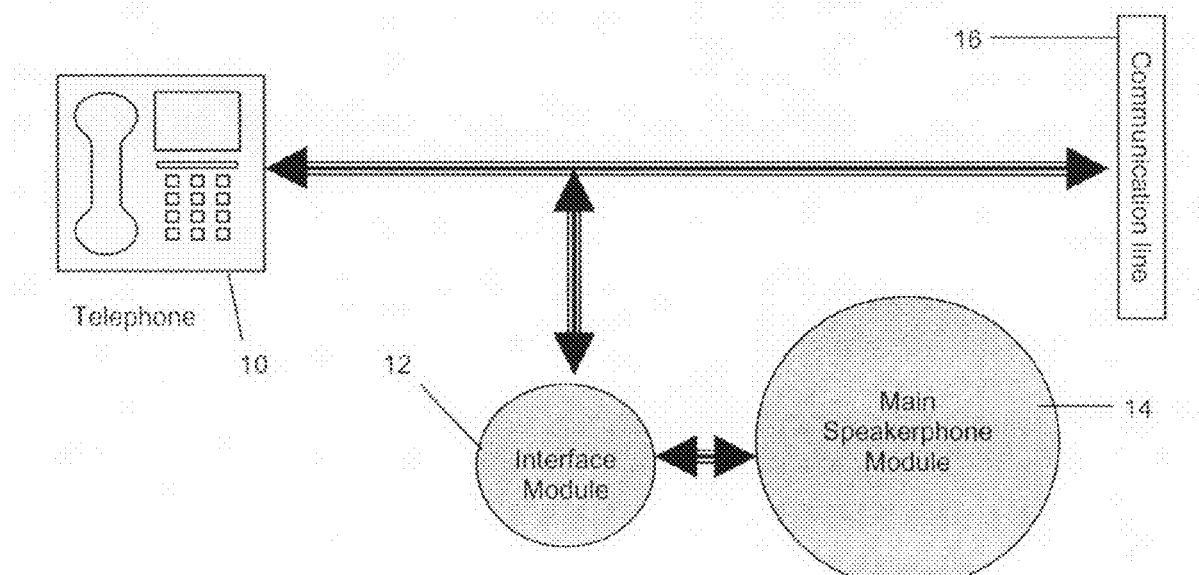
FIG. 2 shows a schematic view of the interface module of the present invention situated within a standard telephone configuration.

FIG. 2 shows a schematic view of the interface module of the present invention situated within a standard telephone configuration. As shown in FIG. 2, the interface module 12 and the main speakerphone module 14 reside between the standard telephone or handset 10 and the communication line 16. The interface module 12 is a controller unit that interfaces between the main speakerphone module 14 and the telephone 10 and communications line 16, without regard to the manufacturer of the telephone 10 or the type of telephone communications infrastructure 16.

From FIG. 2, it can be seen that the interface module 12 is in this embodiment not integrally connected with the main speakerphone module 14. Thus, the speakerphone 14, which is typically the most expensive part of such equipment, can be chosen independently of the carrier or communications protocol or technology, and the interface module 12 may simply be switched or modified as needed. The user/reseller/OEM can easily install or change the interface module 12 to one that is designed to communicate with the particular communication infrastructure that is present. Thus, because it may be used with any carrier or communications protocol or technology, it may be referred to generically as "the universal speakerphone".

Figure 3:
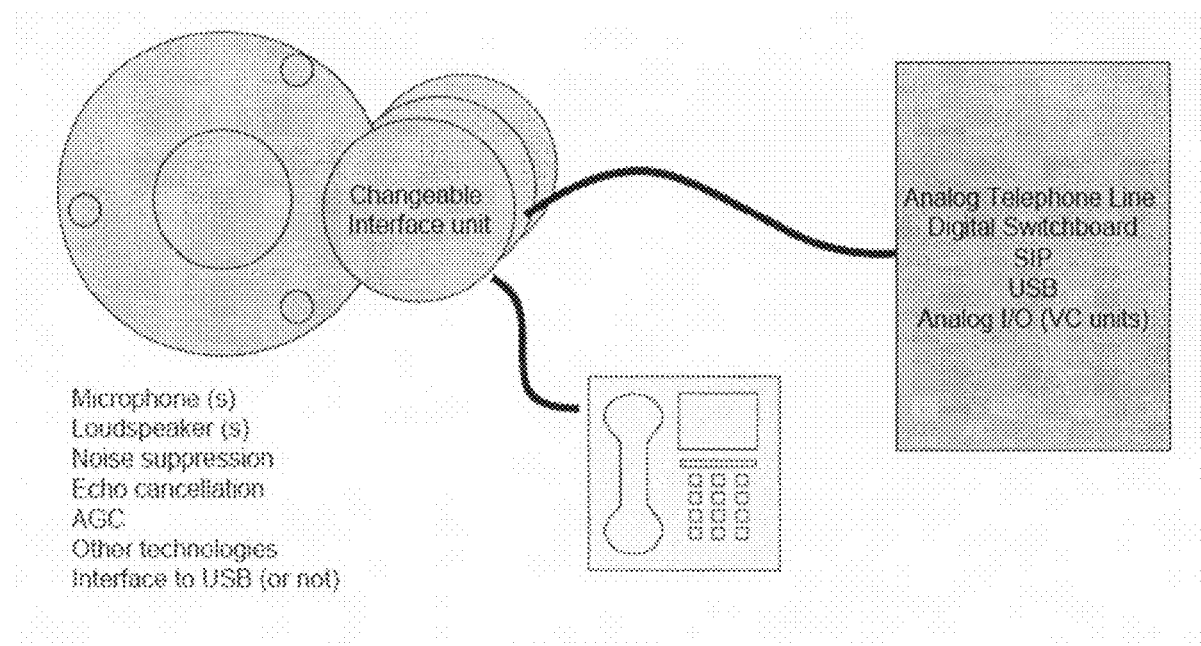
FIG. 3 shows a view of the interface module in a generic network.

FIG. 3 is an alternative view of the of the interface module of the present invention situated within a standard telephone configuration. As shown in FIG. 3, the communication line 16 could be any of the standard telephone communication system, such as traditional analog telephone communication (POTS), digital switchboards, Session Initiation Protocol (SIP), USB interface connection or Analog In/Out. The main speakerphone module 14 is a uniform conferencing speakerphone that contains all the functions of a standard speakerphone, such as at least one microphone, at least one loudspeaker, as well as perhaps other features, such as noise suppression, echo cancellation, Automatic Gain Control (regulation of signal level output amplification) and filtering, an interface to USB, as well as other technologies and features. In FIG. 3, it can also be seen that the interface module is not integrally connected with the main speakerphone module. The main speakerphone module 14 has a standard interface to an interface module 12.

In certain embodiments, the interface module 12 and the main speakerphone module 14 may be housed within the same housing as one unit with two distinct functions. In this structure, the user will see one unit, although it will contain the two functionally distinct separate modules, namely the main speakerphone module 14 that provides high end digital speakerphone processing, such as noise cancellation, filtering, etc., and the interface module 12 that allows the main speakerphone module 14 to be used with various communications infrastructures. In such embodiments, it is preferred that the interface module 12 portion of the housing be separable or removable from the speakerphone module 14 portion of the housing, so that the interface module 12 may be exchanged or modified based upon the specific communications infrastructure used.

Figure 4:
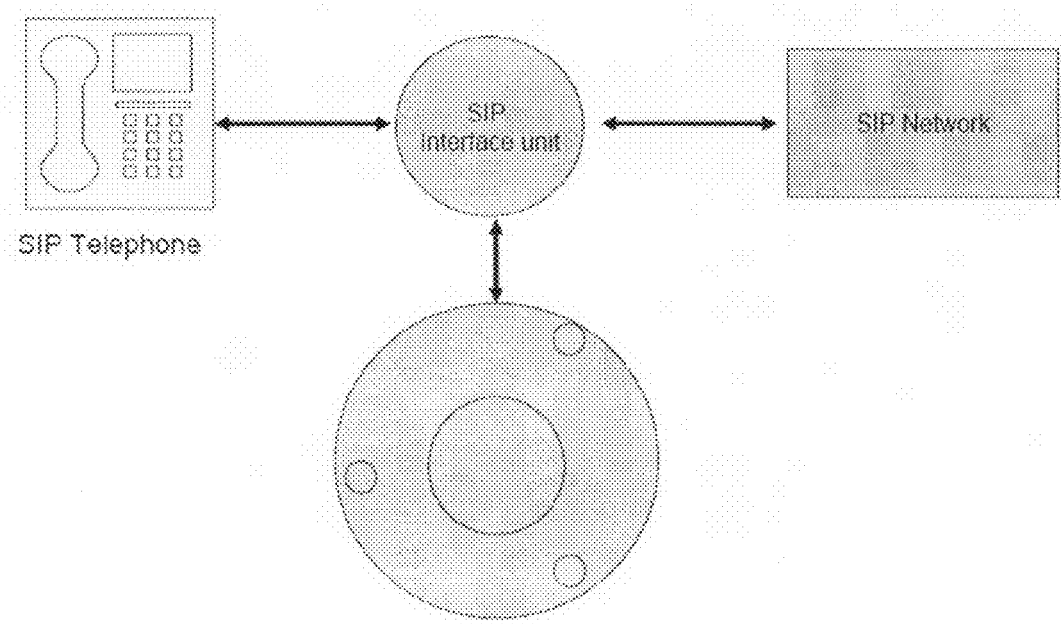
FIG. 4 shows a schematic view of the interface module when used with a SIP network.

When the interface module of the present invention is used with SIP and digital switchboard Interface modules, as shown in FIG. 4, the interface module 12 just sits on the line and monitors the sound/voice data communications dialog between the telephone 10 and the communication line 16 host (server/switch). The interface module 12 allows all the high level handshake to go back and forth untouched and does not interfere with any standard telephone signal processing, allowing the user to utilize the telephone 10 to dial, store and recall memories, talk, etc., as usual. In fact, in certain embodiments, the interface module 12 does not even acknowledge its presence or identify itself to the telephone server.

Instead, the interface module 12 identifies relevant data blocks and replaces them with data from the conference unit. Once the processing unit identifies relevant audio data, it captures the incoming data and sends it to the main speakerphone module 14 and implants the output from the main speakerphone module 14 in the place of the outgoing data.

The only control data that the interface module 12 may alter is the determination of the codec (compression) algorithm used when it is not supported by the interface module 12. The interface module 12 may interfere with the handshake to force a particular compression algorithm (one that is supported by the interface module 12), to accept a call and to terminate a call. The interface module 12 may become totally transparent upon a request from the main speakerphone module 14 (allowing the user to use his telephone 10 for communication).

In one embodiment of the invention, when the user wishes to conduct a "hands free" conversation, the main speakerphone module 14 must first be activated. The user makes an appropriate indication on either the interface module 12 or the main speakerphone module 14, such as by pressing a button. Once this indication has been made, the interface module 12 will also take the processed audio signal from the main speakerphone module 14 and plant it in the communication link in place of the audio signals coming out of the telephone 10. Thus, the interface module will capture the audio signals and send them to the main module speakerphone unit 14 to be played on the loudspeakers in the main module speakerphone unit 14. The main module 14 will also detect voices using one or more microphones, send those audio signals to the interface module in an analog (or digital) form.

The main module 14 may further process those audio signals to allow for higher quality hands free full duplex communication. In order to obtain this improved performance, the main module 14 may perform noise suppression, acoustic echo canceling, line echo canceling, de-reverberation algorithms, microphone array processing, direction finding, beam forming and voice tracking, and other known algorithms to improve sound quality.

In one embodiment, the main module 14 will pick up voices through several, e.g., four, microphones, estimate the direction of the voice source based on the signal level on the several different microphones, create a single output from a combination of the several separate microphone signals such that there is a preferred listening direction (aimed towards the source), perform noise suppression on the single output, perform acoustic echo cancellation and line echo cancellation and deliver a higher quality audio pickup signal. At the same time, the main module 14 may improve the quality of the signal received from the far end such that its levels are conditioned and the frequency response is optimized.

Figure 5:
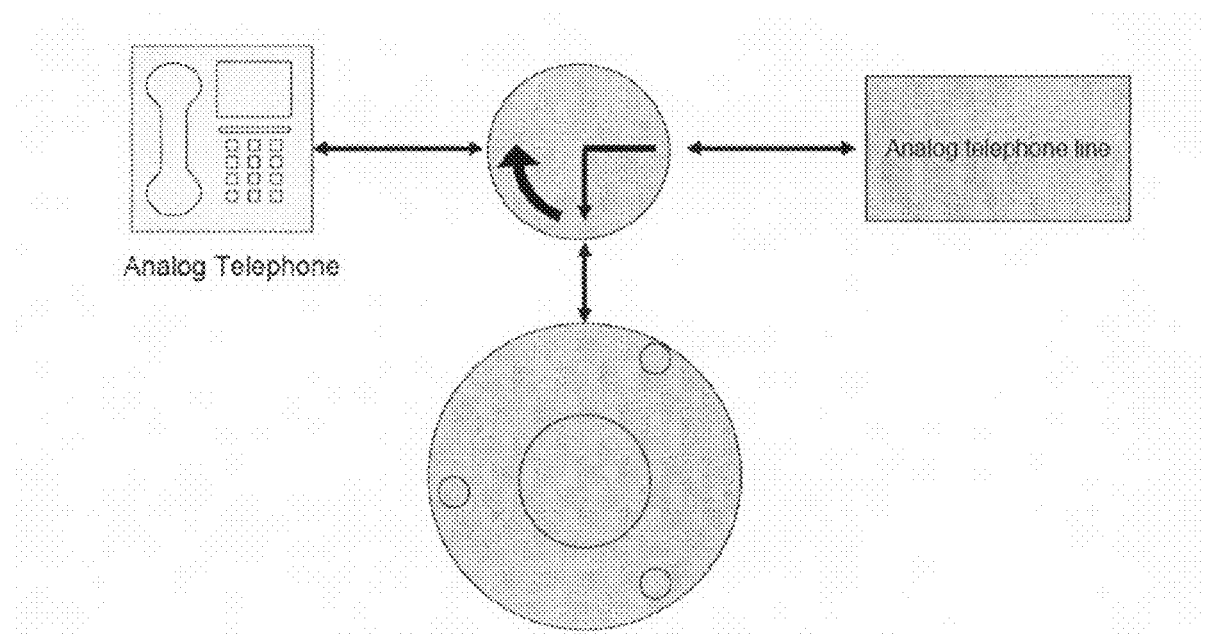
FIG. 5 shows a schematic view of the interface module when used with an analog telephone line.

For POTS (Plain Old Telephone Service), i.e., when the interface module is used with an analog telephone line, as shown in FIG. 5, the interface module 12 includes a switch that will connect the communications infrastructure 16 to either the telephone 10 or to the main speakerphone module 14. In effect, the interface module 12 switches the connection between the telephone 10 and the main speakerphone module 14. The telephone 10 rings, performs the dial up and other functions, and the main speakerphone module 14 "stills" the line when the audio portion takes place. The interface module 12 will connect the telephone 10 to the communication line 14 as long as there are control signals playing on the line (busy line, ringing and so on), and will switch the line to the main speakerphone module 14 once voice communication is established. In one embodiment, the "switch" may be implemented such that it will allow some signals to come from the telephone 10 even when the speakerphone module 14 is activated. For example, dial tones using the telephone's dial pad, so that the user can respond to a request by an automatic service, while listening through the speakerphone.

The present invention can be embodied in many different configurations that will accomplish the objects of the present invention.

Figure 6:
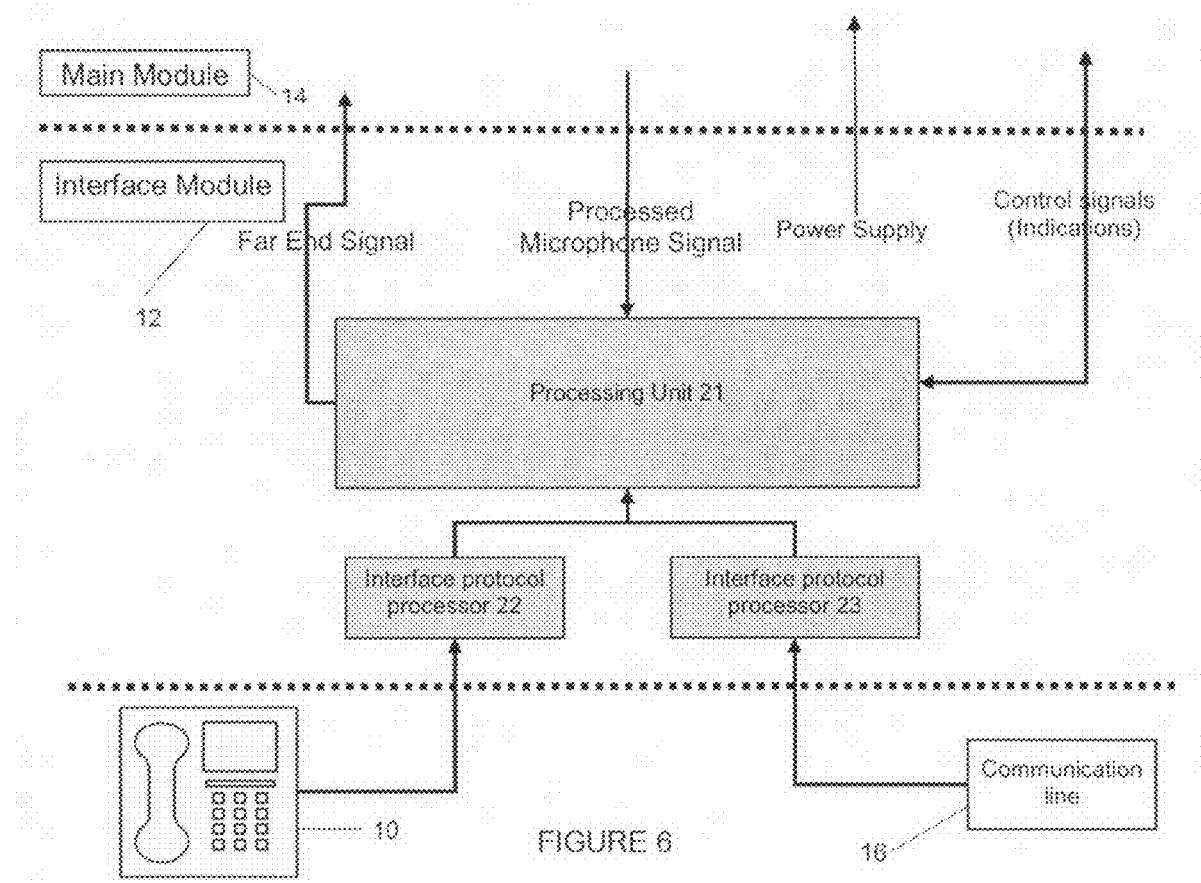
FIG. 6 is a block diagram of the functional features of the interface module.

FIG. 6 shows one such embodiment, namely a block diagram of the functional features of one embodiment of the interface module 12, which sits between the main speakerphone module 14 and the telephone 10. In this embodiment, the interface module 12 has a processing unit 21 and interface protocol processors 22,23 that communicate with telephone 10 and communication line 16, respectively, detecting the sound signals and converting them for processing unit 21. In many communication protocols, the information of all the units is transmitted together, i.e., time multiplexed.

In one embodiment, processing unit 21 analyzes the protocol to identify which of the packets is intended for the telephone to which it is connected and strips the audio for that telephone. Processing unit 21 is programmed to recognize information being directed to the telephone and looks for the audio packets within this information. In one embodiment, processing unit 21 knows and waits for response from telephone 10 and then sees the identifying information and understands the interface protocols.

In general, each of the various communications architectures has a different protocol. Of these, SIP is generally considered to be the most complicated, but these are generally known in the art and software can be written specifically for each communications protocol. Some of the languages are proprietary, for example a PBX (Private Business eXchange) used by Panasonic, and a manufacturer would have to obtain such information in order to custom design equipment to conform to that that private communications protocol.

In a first embodiment, the interface module 12 is specific to one particular telecommunications protocol, such that processing unit 21 incorporates software for that particular telecommunications protocol. In such an embodiment, a software card within the interface module 12 would have to be changed when necessary to deal with a different communications protocol or telephone manufacturer. Alternatively, the entire interface module 12 could be changed, via a simple mechanical connection between the interface module on one hand and the telephone and communications line on the other hand. If the interface module is adapted for one or more particular manufacturer's protocol, the mechanical connection could be specific to that manufacturer(s) whose protocols have been coded for use.

Alternatively, the interface protocol could be programmed for all the specific particular telecommunications protocols, such that even software cards for specific telecommunications protocols need not be changed when the telecommunications protocol is to be changed. In this embodiment, the interface module would have mechanical connections that are specific for the plurality of particular manufacturers whose protocols have been coded for use, and the software would automatically understand which communications protocol software to use when the audio portions of the communication pass between the telephone and the communication line.

Far end sound signals, which are the signals transmitted from the remote end of the communication line and are pushed into the loudspeaker but also used as reference signals for the echo canceller, pass from the interface module 12 to the main speakerphone module 14 for broadcasting on its loudspeaker(s). Processed microphone signals pass from the main speakerphone module 14 to the interface module 12 for sending back to the communications line 16 and to the far-end system. Control signal indications pass back and forth between the main speakerphone module 14 and the interface module 12 to control standard telephone operations, such as volume control, accept/terminate a call, mute, and power on/off. These control signals may also be used to indicate the existence of a specific interface module 12.

Figure 7:
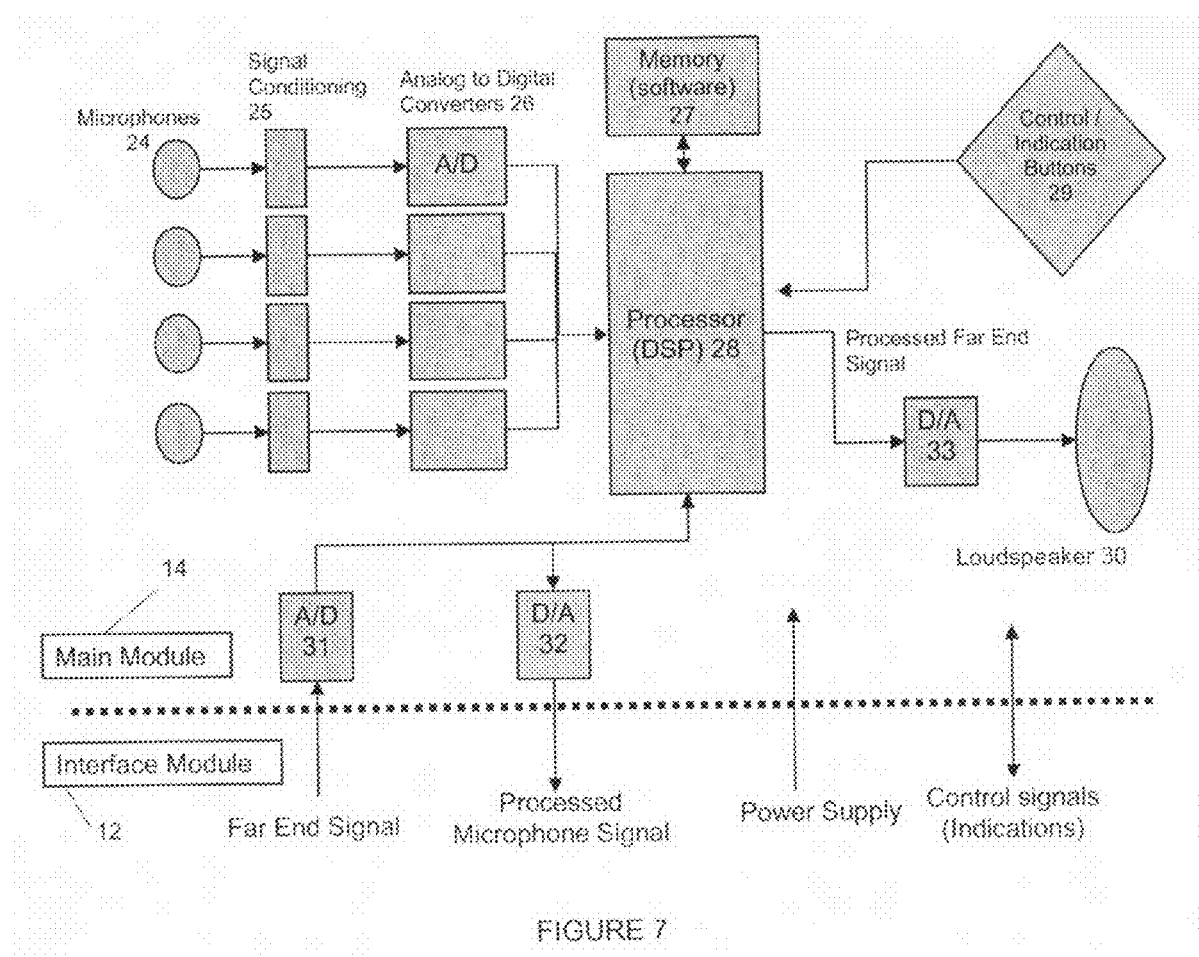
FIG. 7 is a block diagram of the functional features of the main speakerphone module.

FIG. 7 is a block diagram of the functional features of the main speakerphone module 14 as connected to the interface module 12. As indicated above, far end sound signals pass from the interface module 12 to the main speakerphone module 14, where they are processed in an analog/digital converter 31 to convert the analog sound signals to digital format. These digital sound signals are next passed through processor 28 and then through a digital/analog converter 32 to convert the digital sound signals back into analog format, and these processed sound signals are played to the user through at least one speaker or loudspeaker 30. If the communication is digital, analog/digital converter 31 and digital/analog converter 32 may not be needed because the interface unit will send digital information to the speakerphone and receive processed digital information in return.

Main speakerphone module 14 also has at least one microphone 24 for accepting sound signals, which are then passed through signal conditioning modules 25 to adjust the microphone levels and frequency response to an optimum value, and through analog/digital converters 26 to convert the analog sound signals to digital format. The sound signals are then passed through processor 28 and through a digital/analog converter 32 to convert the digital sound signals back into analog format, and these processed microphone signals pass from the main speakerphone module 14 to the interface module 12 for sending back to the communications line 16 and to the far-end system.

Main speakerphone module 14 also has memory storage unit 27 connected to the processor 28 for storage of sound and other telephone information, such as voice recognition or telephone numbers, as well as control/indication buttons 29, such as those that exist on a standard telephone or speakerphone, including Volume Up/Down, Accept/Terminate a Call, Mute, and a Power On indication. In one embodiment, unit 27 stores the software for the processing unit 21. This software is uploaded to the processor 21 automatically upon reset or power up.

As stated previously, control signal indications pass back and forth between the main speakerphone module 14 and the interface module 12. These control signals may also be used to indicate the existence of a specific interface module or send an Accept/Terminate Call signal.

The main speakerphone module 14 may include an additional external input, which can be used to pick up voices from an external microphone (such as wireless). This input can be also used to bring-in the process output of another speakerphone unit. Utilizing these feature units can be cascaded to provide larger room coverage.

Figure 8:
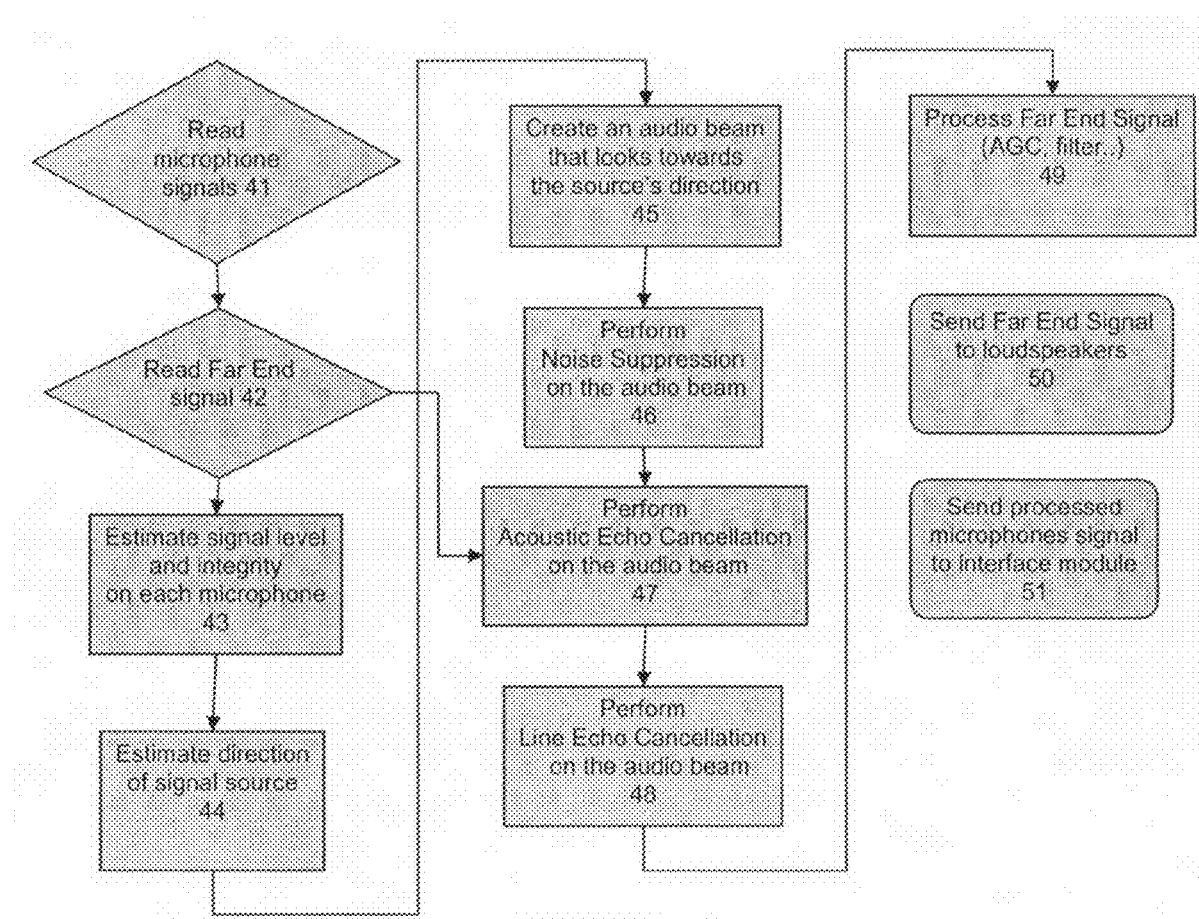
FIG. 8 is a process flow diagram of the operation of the processor of the main speakerphone module.

FIG. 8 is a process flow diagram of the operation of the processor 28 of the main speakerphone module 14. When the speakerphone of the present invention is engaged, processor 28 reads the analog-format, conditioned microphone signals passed from analog/digital converters 26 (block 41). Processor 28 also reads the analog-format far end signal from the interface module 12 via analog/digital converter 31 (block 42). The processor 28 then estimates signal level and integrity on each microphone (block 43), estimate the direction of the signal source (block 44), creates an audio beam that looks towards the source's direction (block 45), and performs noise suppression on the audio beam (block 46). (Each of these actions is a speakerphone function that is well known in the art, as discussed for example in U.S. Pat. No. 6,049,607.

At the same time, processor 28 performs Acoustic Echo Cancellation and Line Echo Cancellation on the audio beam (blocks 47, 48), and then processes the far end signal (AGC, filtering, etc.) (block 49). The processor 28 then sends the processed far end signal to loudspeakers 30 and sends the processed microphone signal to interface module, via digital/analog converter 32 (blocks 50, 51).

Thus, a system and method for providing a universal speakerphone interface as been provided. One skilled in the art will appreciate that the present invention can be practiced by other than the described embodiments, which are presented for purposes of illustration and not limitation. Further, since numerous modifications and changes will readily occur to those skilled in the art, it is not desired to limit the invention to the exact construction and operation shown and described, and accordingly, all suitable modifications and equivalents may be resorted to, without departing from the scope or spirit of the invention as defined in the appended claims.

What is claimed is:

1. A universal speakerphone assembly for use in a communications system, comprising:
    a housing, said housing comprising:
        a speakerphone module including at least one microphone and at least one loudspeaker, and not specifically adapted to function according to protocols of any particular communications carrier, and
        an interface module adapted to enable said speakerphone module to function according to the protocols of a specific, predetermined communications carrier, said interface module connected between (1) a data bus of said communications system through which sound signals are sent to a handset, and (2) said handset through which a user sends sound signals to said data bus for transmission to a remote location, and said interface module adapted to intercept sound signals transmitted between said data bus and said handset, and to send said sound signals to said speakerphone module.

2. The universal speakerphone assembly of claim 1, wherein said speakerphone module is further capable of performing at least one of noise suppression, echo cancellation, automatic gain control and filtering.

3. The universal speakerphone assembly of claim 1, wherein said interface module comprises at least one external connector for physical connection to said data bus.

4. The universal speakerphone assembly of claim 3, wherein at least one of said at least one external connector is specifically configured for physical connection to the data bus of said specific, predetermined communications carrier, and wherein said interface module and said external connector may be removed from said housing and exchanged for a second interface module and external connector that is specifically configured for physical connection to the data bus of a different communications carrier.

5. The universal speakerphone assembly of claim 1, wherein said interface module comprises a processing device programmed to interpret the protocol of only said specific, predetermined communications carrier.

6. The universal speakerphone assembly of claim 1, wherein said interface module comprises a processing device programmed to interpret the protocol of a plurality of specific communications carrier, including that of said specific, predetermined communications carrier.

7. The universal speakerphone assembly of claim 1, wherein, upon activation of said speakerphone module, said interface module captures audio signals from said data bus and sends them to said speakerphone module.

8. The universal speakerphone assembly of claim 1, wherein, upon activation of said speakerphone module, said interface module sends processed audio signals from said speakerphone module to said data bus in place of audio signals from said handset.

9. The universal speakerphone assembly of claim 1, wherein said interface module intercepts sound signals transmitted between said data bus and said handset and intervenes only in the audio portion of said signals.

10. The universal speakerphone assembly of claim 1, wherein said protocols of a communications carrier may be traditional analog telephone communication, digital switchboard, USB interface connection to a computer, Analog In/Out, Session Initiation Protocol, or wireless communication.

11. The universal speakerphone assembly of claim 1, wherein said interface module is removable from said housing.

12. The universal speakerphone assembly of claim 1, wherein said interface module intercepts all signals transmitted between said data bus and said handset and intervenes only in the audio portion of said signals.

13. In a communications system having a data bus through which sound signals are sent by a communications carrier to a handset and having a handset through which a user sends sound signals to said data bus for transmission to a remote location, a speakerphone assembly comprising:

a housing, said housing comprising:

a speakerphone module including at least one microphone and at least one loudspeaker, and not specifically adapted to function according to protocols of said communications carrier, and an interface module adapted to enable said speakerphone module to function according to the protocols of a specific, predetermined communications carrier, said interface module connected between said data bus and said handset and adapted to intercept sound signals transmitted therebetween and to send said sound signals to said speakerphone module.

14. The speakerphone assembly of claim 13, wherein said speakerphone module is further capable of performing at least one of noise suppression, echo cancellation, automatic gain control and filtering.

15. The speakerphone assembly of claim 13, wherein said interface module comprises at least one external connector for physical connection to said data bus.

16. The speakerphone assembly of claim 15, wherein at least one of said at least one external connector is specifically configured for physical connection to the data bus of said specific, predetermined communications carrier, and wherein said interface module and said external connector ma be removed from said housing and exchanged for a second interface module and external connector that is specifically configured for physical connection to the data bus of a different communications carrier.

17. The speakerphone assembly of claim 13, wherein said interface module comprises a processing device programmed to interpret the protocol of only said specific, predetermined communications carrier.

18. The speakerphone assembly of claim 13, wherein said interface module comprises a processing device programmed to interpret the protocol of a plurality of specific communications carriers, including that of said specific, predetermined communications carrier.

19. The speakerphone assembly of claim 13, wherein, upon activation of said speakerphone module, said interface module captures audio signals from said data bus and sends them to said speakerphone module.

20. The speakerphone assembly of claim 13, wherein, upon activation of said speakerphone module, said interface module sends processed audio signals from said speakerphone module to said data bus in place of audio signals from said handset.

21. The speakerphone assembly of claim 13, wherein said interface module intercepts sound signals transmitted between said data bus and said handset and intervenes only in the audio portion of said signals.

22. The speakerphone assembly of claim 13, wherein said protocols of a communications carrier may be traditional analog telephone communication, digital switchboard, USB interface connection to a computer, Analog In/Out, Session Initiation Protocol, or wireless communication.

23. A universal speakerphone assembly for use in a communications system, said communications system having a data bus though which audio signals are transmitted to a handset from a remote location and though which a user sends audio signals from said handset for transmission to a remote location, the universal speakerphone assembly comprising:

a speakerphone module including at least one microphone and at least one loudspeaker, and not specifically adapted to function according to the protocols of any particular communications carrier, and an interface module connected to said speakerphone module and adapted to enable said speakerphone module to function according to the protocols of a predetermined communications carrier, said interface module adapted to be connected between said communications system data bus and said handset, said interface module adapted to intercept audio signals transmitted between said data bus and said handset, and to send said audio signals to said speakerphone module or to said data bus, wherein, upon activation of said speakerphone module, said interface module captures audio signals from said data bus and sends them to said speakerphone module, and sends processed audio signals from said speakerphone module to said data bus in place of audio signals from said handset.

* * * * *